Feb. 16, 1932.  A. I. MARCUM  1,845,674
MULTIWHEEL ROAD VEHICLE
Filed Aug. 30, 1926
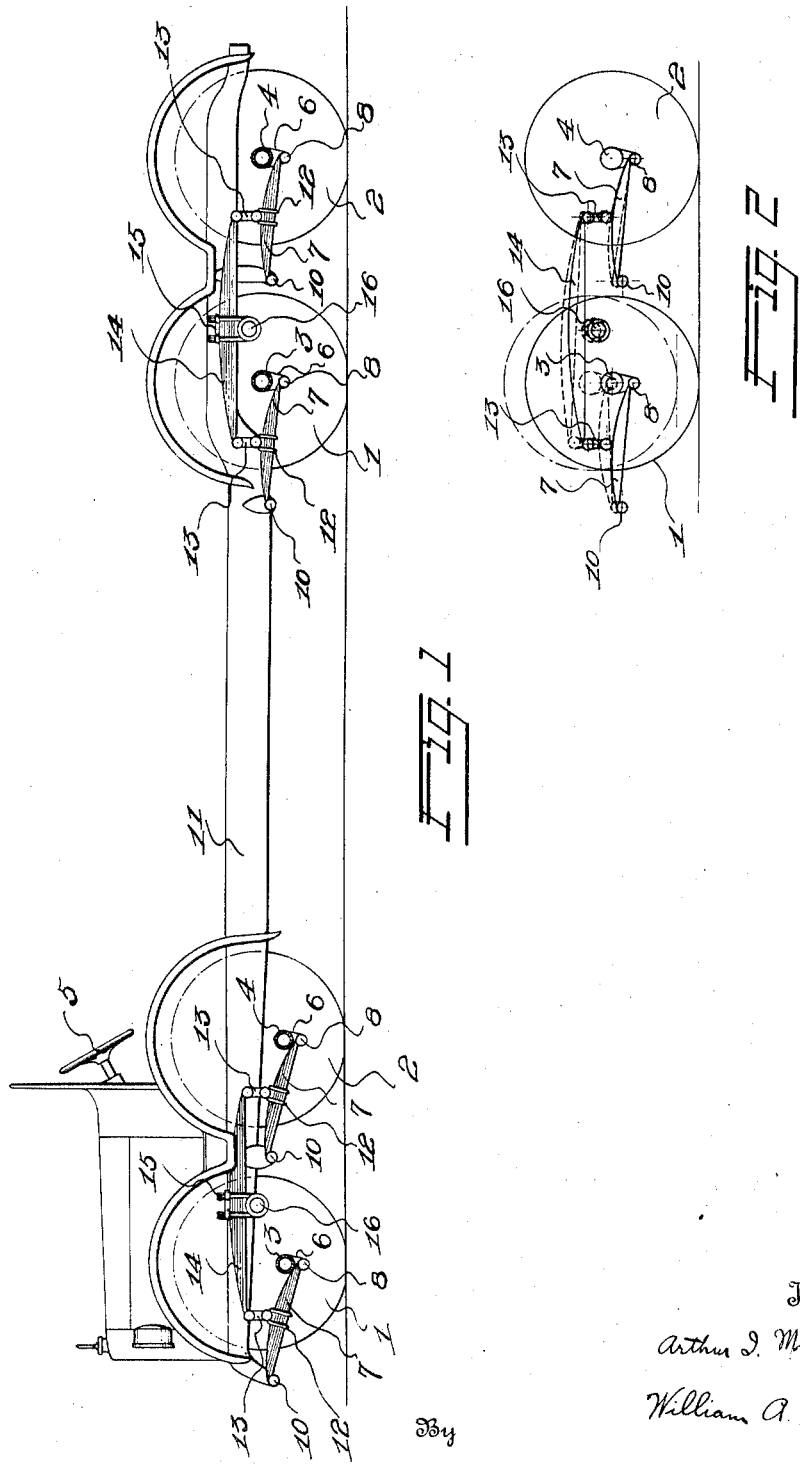
Inventor
Arthur I. Marcum
William A. Strauch
By
Attorney Patented Feb. 16, 1932

1,845,674

UNITED STATES PATENT OFFICE

ARTHUR I. MARCUM, OF OAKLAND, CALIFORNIA, ASSIGNOR, BY MESNE ASSIGNMENTS, TO AUTOMOTIVE ENGINEERING CORPORATION, A CORPORATION OF DELAWARE

MULTIWHEEL ROAD VEHICLE

Application filed August 30, 1926. Serial No. 132,618.

The present invention relates to multi-wheel vehicles.

More particularly the invention relates to improved eight wheel motor vehicle constructions in which the vertical or up and down, and the fore and aft frame movement as the wheels pass over road irregularities is reduced to a minimum. In the usual types of four wheel motor vehicles the vertical frame movement is equal to the total vertical wheel movement, modified only by the spring deflections. This results in a substantial vertical movement of the frame and load carried thereby causing heavy road impacts and shocks, introducing heavy stresses and strains in the vehicle and imparting poor riding qualities thereto.

To overcome such defects of four wheeled vehicles, and to increase the load carrying capacity of road vehicles, various types of road vehicles commonly termed multi-wheel vehicles have been proposed in which pairs of tandem axles are disposed beneath the forward and rear ends of the frame in which the vertical or up and down movement of the frame unmodified by or independently of deflections of the springs is one-half of the total wheel movement. In most of such arrangements, the tandem axles of each pair are connected in independent truck constructions which in turn are connected to the frame in such manner that a substantial fore and aft or rocking movement is introduced that imparts poor riding qualities and undue stresses and strains in the vehicle.

In my copending application Serial No. 54,560, filed September 4, 1925, I have shown a multi-wheel road vehicle in which the independent truck construction for the tandem axles is eliminated and the up and down frame movement independently of the effect of spring deflection is substantially one-half of the wheel movement. The present invention is an improvement over that disclosed in said copending application in that the up and down frame movement is still further reduced, reducing the road shocks and strains in the vehicle and further improving the riding qualities.

Accordingly, an object of the present invention is to provide an improved multi-wheel road vehicle in which substantially all fore and aft movement of the vehicle frame is eliminated as the vehicle passes over road irregularities, and at the same time the up and down frame movement independently of the effect of the spring deflections is substantially less than one-half of the wheel movement.

Further objects of the invention are such as may be attained by a utilization of the combinations and sub-combinations more fully hereinafter set forth, and as defined by the terms of the appended claims.

As shown in the drawings,

Figure 1 is a diagrammatic side elevation showing the essential features of my improved invention.

Figure 2 is a diagrammatic view showing the relative extent of wheel and frame movement when one of the wheels passes over a projection in the road surface.

Referring to Figure 1, disposed beneath the ends of the vehicle are sets of tandem wheels 1 and 2 which support the tandem axles 3 and 4 in well known manner. The front pairs of wheels 1 and 2 are dirigible and are actuated by means of the steering wheel 5 through a suitable steering linkage (not shown) and the rear pairs of wheels 1 and 2 are driven by a suitable drive mechanism (not shown) in well known manner. Steering and drive mechanisms such as shown in said copending application may obviously be utilized. Formed at opposite sides of the axles 3 and 4 are the depending projections 6 to which the rear ends of the leaf springs 7 are pivotally connected by means of suitable pins 8. Springs 7 are inclined and their forward ends are connected by means of pins 10 to suitable projections and brackets formed integrally with or rigidly secured to the vehicle frame side members 11. Secured to and supported in the centers of the spring 7 are the saddles 12 to which are pivotally secured the lower ends of the shackles or links 13. The upper ends of the shackles 13 are connected by means of pivot pins to the ends of equalizing springs 14. Secured to and supported from the center of springs 14 are the trunnion members 15 in which the frame trunnions 16 are rotatably supported. Trunnions 17 are rigidly secured to and support the frame side members 11 in any suitable manner.

In operation, as one of the wheels passes over a road irregularity as shown in Figure 2, the parts shift from the full line position to the dotted line position shown in Figure 2. The spring reduces the amount of motion transmitted to the end of spring 14 to approximately one-half of the axle movement at the connection of the spring to the axle, and the spring 14 again reduces the motion that is applied to trunnion 16 by one-half. It will accordingly be seen that the vertical movement of the frame will be reduced to substantially less than one-half of the vertical wheel deflection and to approximately one-quarter of the vertical wheel deflection by the effect of the linkage independently of the effect of spring deflection. Due to the resilience of the spring suspension the actual frame movement will be further decreased. It will also be seen that no fore and aft or rocking movement is imparted to the frame, and that road shocks are transmitted through the entire suspension and through spring arms of different lengths and periods of vibrations before being imparted to the frame. The different periods of vibration of the various spring arms dampen the tendency to set up harmonic vibrations of the frame. As a result a road vehicle is provided of improved riding qualities adapted for the transportation of heavy loads at high speed without undue shocks to the road or to the vehicle.

While a preferred embodiment of the invention has been described, it will be apparent to those skilled in the art that wide variations in the disclosed details may be made without departing from the spirit of my invention. Accordingly, what is desired to be secured by Letters Patent and claimed as new is:

1. A road vehicle including a frame, tandem axles at each end of said frame, means securing said axles to said frame, said means including a spring pivoted to said frame for each side and end of the frame, and a spring attached to each axle at one end and to the frame at the other end, and shackled between its ends to the end of a first named spring.

2. A road vehicle including a frame, a pair of axles arranged adjacent each end of said frame the axles of each pair being disposed relatively close to each other, a pair of springs to secure each axle to said frame, each spring being pivoted to the frame at one end and to an axle at the other end, and equalizing springs for each pair of axles at each end and side of the frame, each of said equalizing springs being secured to the frame between its ends and shackled at its ends to the intermediate portions of the adjacent springs that are individual to the axles.

3. A road vehicle comprising a frame, a pair of axles adjacent each end of the frame, each axle of each pair being swingingly secured to said frame by a pair of springs each of which is pivoted to the frame at one end to swing about an axis that is approximately in horizontal alinement with the axis of the axle to which it is attached and connected to said axle adjacent its other end, and an equalizing spring for each pair of axles at each side and end of said frame, said equalizing springs being pivoted between their ends to the frame and being shackled at their ends to an intermediate portion of the springs individual to the axles at that side and end of the frame.

In testimony whereof I affix my signature.
ARTHUR I. MARCUM.